A. C. ZIERATH.
DRILL PIPE WITH LOCK JOINT.
APPLICATION FILED JUNE 19, 1912.
1,054,812.
Patented Mar. 4, 1913.
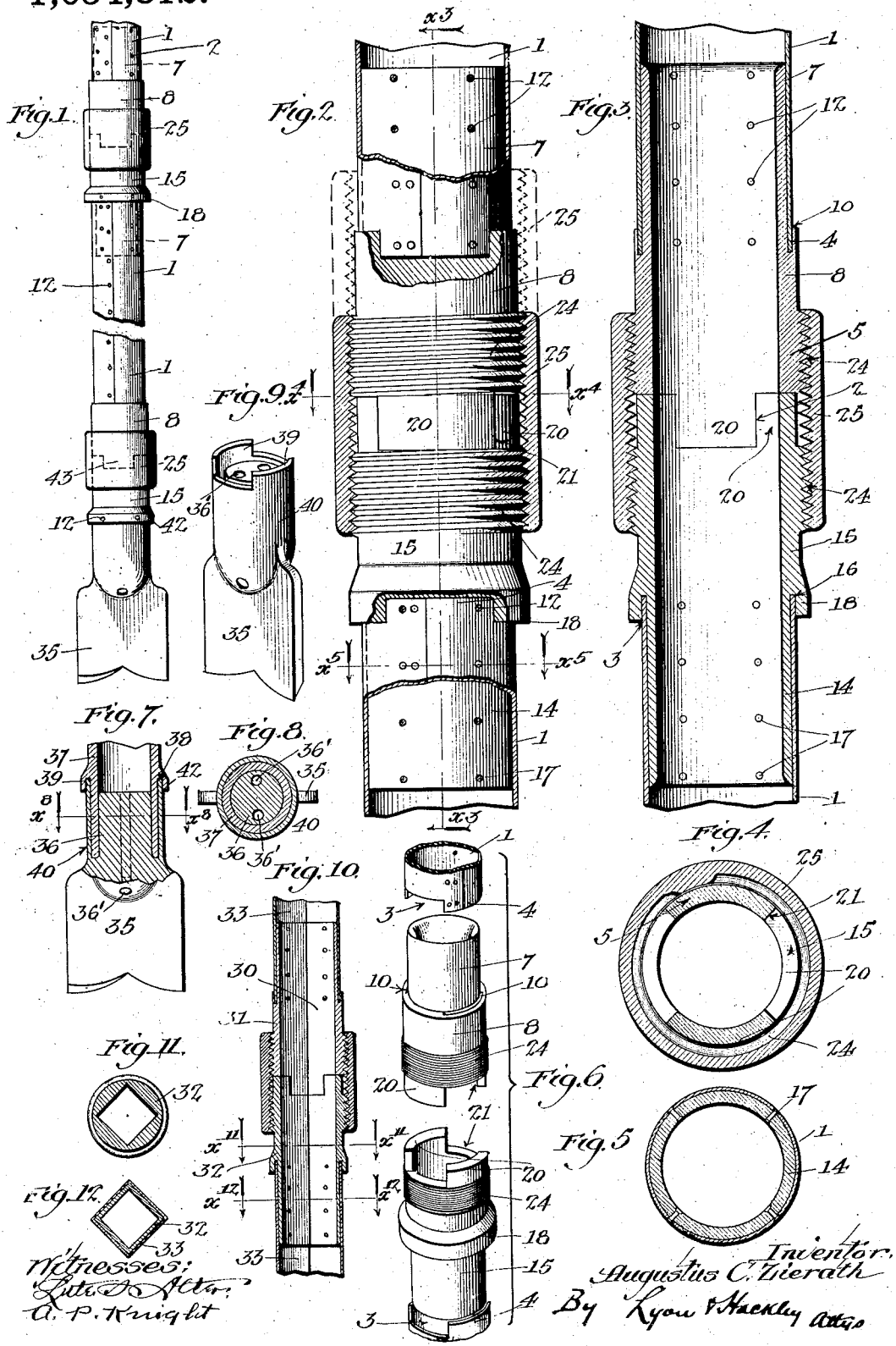
Witnesses:
Inventor,
Augustus C. Zierath
By Lyon & Hackley Attys

UNITED STATES PATENT OFFICE.

AUGUSTUS C. ZIERATH, OF LOS ANGELES, CALIFORNIA.

DRILL-PIPE WITH LOCK-JOINT.

1,054,812.  Specification of Letters Patent.  Patented Mar. 4, 1913.

Application filed June 19, 1912. Serial No. 704,675.

*To all whom it may concern:*

Be it known that I, AUGUSTUS C. ZIERATH, a citizen of the United States, residing at Los Angeles, in the county of Los Angeles and State of California, have invented a new and useful Drill-Pipe with Lock-Joint, of which the following is a specification.

The main object of the present invention is to provide a drill pipe for use in rotary drilling in which the rotary strain is taken by a positive lock joint so that no rotary strain is brought on the screw coupling for the joint.

A further object of the invention is to provide a drill pipe with lock joint that can be used to rotate the drill and line of pipe in either direction, right or left, without liability to parting at the joint.

A further object of the invention is to provide a drill pipe which can be used to back out any casing which has become lodged in the well, without the necessity of putting in a reverse or left-handed thread pipe.

A further object of the invention is to maintain the full strength of the drill pipe at the joint and to reinforce said pipe at the joint instead of diminishing its strength.

A further object of the invention is to provide improved means for securing the bit to the rotary drill pipe in such manner that it will not back off in turning the bit in reverse direction.

Further objects of the invention will appear hereinafter.

The accompanying drawings illustrate embodiments of my invention, and referring thereto:

Figure 1 is a side elevation of the lower portion of the drill pipe. Fig. 2 is a side elevation partly in section of a portion of the pipe at a joint. Fig. 3 is a section on line $x^3$—$x^3$ in Fig. 2. Fig. 4 is a section on line $x^4$—$x^4$ in Fig. 2. Fig. 5 is a section on line $x^5$—$x^5$ in Fig. 2. Fig. 6 is a perspective of the members of a joint with an adjacent pipe portion in detached position. Fig. 7 is a vertical section partly in elevation of the bit and the joint therefor. Fig. 8 is a section on line $x^8$—$x^8$ in Fig. 7. Fig. 9 is a perspective of the bit with its attaching or joint member. Fig. 10 is a vertical section of a joint used in connection with square drill pipe. Fig. 11 is a section on line $x^{11}$—$x^{11}$ in Fig. 10. Fig. 12 is a section on line $x^{12}$—$x^{12}$ in Fig. 10.

The rotary drill pipe comprises pipe sections 1 which are preferably made somewhat heavier than the ordinary drill pipe and which are formed with rivet holes 2 near their upper and lower ends and with cut-away portions or notches 3 in their upper and lower ends forming intervening teeth or projecting portions 4. Each pipe section at each end thereof is provided with an attaching or coupling member rigidly secured thereto. The coupling member at the bottom of each pipe section may consist of a sleeve or tubular body 5 whose upper end portion 7 is of proper diameter to fit tightly within the pipe section, the body portion of said sleeve being enlarged below said upper end portion 7 and said enlarged body portion being provided with arc-shaped recesses or channels 10 to receive and fit the projecting portions 4 of the pipe section. Rivets indicated at 12 extending through the perforations 2 in the pipe section and through the upper portion 7 of the coupling member, rigidly secure the pipe section to the coupling member. Additional rivets 12 may extend through the projecting portions 4 of the section and through the body portion 5 of the coupling member to further secure the parts together. The upper end of each pipe section is provided with a coupling member rigidly secured thereto and comprising a lower portion 14 fitting within the pipe section and a body portion 15 formed with arc-shaped grooves 16 fitting the projections 4 at the upper end of the pipe section, the parts being secured together by rivets 17 extending through the pipe section and through the portions 14 and 15 of the coupling member. The portion 15 of the coupling member may be provided with an enlargement or shoulder 18 forming an elevator collar.

The upper and lower coupling memb 5 and 15 are provided at their ends when are farthest from the pipe sections with interengaging projections and slots, each of said members having, for example, diametrically opposite projections 20 with intervening slots 21 so that when said members are placed together end to end, the projections 20 of each member will fit in the slots 21 of the other member. These interengaging portions of the joint members constitute a lock giving a positive rotative connection between the members without dependence on any screw thread. The coupling members 5 and 15 are further provided with screw threaded portions 24 extending outwardly from the body portions of the said members, so that the screw threaded coupling sleeve 25 may screw over the screw threads 24 and clear the peripheries of the coupling members.

In coupling the pipes at a joint, the sleeve 25 is first screwed up to position shown in dotted lines in Fig. 2, so that it will be clear of the lock joint. The coupling members are then brought together so as to interengage and interlock by their respective projections and recesses 20 and 21, and the coupling sleeve 25 is then screwed down so as to engage on the thread 24 of the lower coupling member, this coupling sleeve then holding the parts together against vertical strain. In operation of the drill, however, all rotative strain is taken by the lock joint constituted by the projections 20. In case square drill pipe is used, as shown in Figs. 10 to 12, the interior bore 30 of the coupling members 31 and 32 is made of square cross section and the pipe sections 33 are secured thereto in the same manner as above described, the construction being otherwise as above stated.

An important feature of the present invention is the ability to rotate the drill pipe in either direction, right or left, and in this connection it is essential to provide a bit which can be rotated in either direction without backing off of the drill pipe. For this purpose I provide a joint between the drill pipe and the lowest pipe section which is similar to that above described, the bit indicated at 35 having a solid shank 36 fitting within the lower end of a coupling member 37 which is channeled as at 38 to receive projecting portions 39 on a cylindrical sheath 40 which is formed integrally with the body of the bit and extends upwardly around the lower end portion of the coupling member. The coupling member aforesaid is provided with an elevator collar 42 and with lock joint portions 43 similar to the corresponding parts above described and is secured to the bit 35 by means of rivets 12.

Shank 36 has passages 36' for passage of water.

What I claim is:

1. A rotary drilling pipe comprising a plurality of sections, each provided at each end with coupling members, said coupling members having projections for interlocking to couple the members against rotary strain, a screw sleeve screwing on said coupling members to hold them together, each coupling member consisting of a tubular body having an extension fitting in the adjacent end of a pipe section, each end of each pipe section having projections, and the adjacent portions of the coupling member being recessed to receive and fit said projections on the pipe sections, and said pipe sections being riveted to said coupling members.

2. In combination with a rotary drilling pipe section, provided at its lower end with a coupling member, of a bit having a shank and a tubular sheath surrounding said shank, and having projections and a coupling member fastened to said sheath and extending between said shank and tubular sheath, and channeled to receive the projections on said sheath, and means for securing said coupling members together.

3. A pipe section for a rotary drilling pipe having a coupling member at each end, said coupling member being tubular and provided with arc-shaped grooves, and said pipe sections having projections extending into and fitting in said grooves, said pipe sections being riveted to said tubular coupling member.

In testimony whereof, I have hereunto set my hand at Los Angeles, California this 14th day of June, 1912.

AUGUSTUS C. ZIERATH.

In presence of—
ARTHUR P. KNIGHT,
MARTHA M. LANGE.